United States Patent [19]

Straus et al.

[11] Patent Number: 5,493,540
[45] Date of Patent: Feb. 20, 1996

[54] SYSTEM FOR ESTIMATING FAR-FIELD ACOUSTIC TONALS

[75] Inventors: James E. Straus, San Diego; Richard L. Allman, La Crescenta; Willis L. Frisch, Potrero; Matthew J. Nicholson, San Diego; Richard W. White, Solana Beach, all of Calif.

[73] Assignee: The United States of America as represented by the Secretary of the Navy, Washington, D.C.

[21] Appl. No.: 272,914

[22] Filed: Jun. 30, 1994

[51] Int. Cl.$^6$ .................................................. H04B 11/00
[52] U.S. Cl. ............................................. 367/135; 367/131
[58] Field of Search ................................... 367/131, 133, 367/134, 135, 13

[56] References Cited

U.S. PATENT DOCUMENTS

| | | |
|---|---|---|
| 3,166,748 | 1/1965 | Shanks et al. . |
| 3,790,927 | 2/1974 | Chwastyk .............................. 367/133 |
| 4,201,987 | 5/1980 | Tricoles et al. . |
| 4,648,080 | 3/1987 | Hargreaves . |
| 4,658,384 | 4/1987 | Dragoset, Jr. et al. . |
| 5,014,250 | 5/1991 | Hadderingh . |
| 5,047,990 | 9/1991 | Gafos et al. ............................ 367/134 |
| 5,226,016 | 7/1993 | Christman .............................. 367/135 |

OTHER PUBLICATIONS

C. W. Horton et al, "The Computation of Far-Field Radiation Patterns from Measurements Made Near the Source", *The Journal of the Acoustical Society of America*, vol. 13, No. 7, Jul. 1961, pp. 877–880.

S. Gade, "Sound Power Determinations from Sound Intensity Measurements", *Sound and Vibration*, Dec. 1989, pp. 18–22.

E. G. Williams et al, "Nearfield Acoustical Holography Using an Underwater Automated Scanner", *J. Acoust. Soc. Am.*, vol. 78, No. 2, Aug. 1985, pp. 789–798.

F. R. Crawford, "Submarine Radiated Noise Far–Field Beam Patterns for Discrete Frequencies from Near–Field Measurements", *Naval Post Graduate School*, Monterey CA, Dec. 1975.

*Primary Examiner*—Daniel T. Pihulic
*Attorney, Agent, or Firm*—Harvey Fendelman; Thomas Glenn Keough; Peter A. Lipovsky

[57] ABSTRACT

A system and method for estimating a ship's far-field acoustic characteristics includes at least one reference hydrophone and at least one movable hydrophone, both of which are disposed in the water closely adjacent the ship. The movable hydrophone senses acoustic tonals at a plurality of points on the surface of an imaginary prolate spheroid surrounding the ship, the major and minor axes of which are roughly equal to one-half the length of the ship and the beam of the ship, respectively. The phase difference in the signals from the movable hydrophone and reference hydrophone are compared to generate a near-field data set. A computer is used to estimate a far-field data set representative of the ship's acoustic characteristics based on the near-field data set. Thus actual far-field measurements are not required.

12 Claims, 6 Drawing Sheets

SYSTEM FOR ESTIMATING FAR-FIELD ACOUSTIC TONALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to sound monitoring systems and more particularly to shipborne apparatus and methods for estimating the far-field acoustics of a vessel.

Modern military ships use passive sonar techniques to detect and track target vessels. Passive sonar depends upon the detection and analysis of sound, usually machinery noise, which emanates from a target vessel and which propagates through the water to a listening vessel.

Discrete acoustic frequencies within an emanated sound, referred to as narrowband tonals, are more easily detectable at longer distances from a target vessel than the broadband frequencies radiated from the vessel. Such narrowband tonals can be directional, i.e., the amplitude of a narrowband tonal is typically a function of the radiating ship's azimuth.

The amplitude versus frequency distribution of a ship's radiated noise is commonly referred to as its acoustic signature. Military ships can detect one or more narrowband tonals of a target vessel's acoustic signature at a relatively long range from the vessel, and can analyze the tonals to track the vessel.

Understandably, it is desirable for a potential target vessel to determine its own acoustic signature to reduce its likelihood of being detected by an adversary. Understanding these directional characteristics, for example, can aid the potential target vessel by indicating what azimuthal aspect the vessel should present toward areas where listening vessels are expected to be present. Also, a knowledge of this acoustic signature can provide insight into which machinery onboard the vessel is the source of the radiated tonals, enabling the vessel to take steps to reduce these sounds.

Moreover, knowledge of one's vessel's acoustic signature can enable an analysis of this radiated noise to determine which, if any, onboard machinery may require maintenance. Machinery that has, for example, worn bearings will tend to radiate more noise than otherwise. Thus, an increase or other change in a vessel's acoustic signature may indicate the impending failure of onboard machinery, and thus alert the vessel's personnel to perform maintenance or other work on the machinery.

Accordingly, systems have been introduced for determining the acoustic signature of vessels. Under these systems, it is typical that a vessel's acoustic signature must be acquired in the Fraunhofer region of the radiated sound. This region is commonly referred to as the far-field and is defined as the distance beyond which the angular distribution of radiated energy is essentially independent of distance from the source. These systems can generally be categorized as "direct" measuring systems.

U.S. Pat. No. 5,047,990 issued to Gafos et al. discloses such a direct measuring system. While apparently effective for its intended use, the Gafos et al. system suffers from the typical drawbacks of other systems designed to measure the directionality of a vessel's noise directly, namely, the need for relatively expensive equipment and/or time-consuming monitoring procedures.

SUMMARY OF THE INVENTION

An apparatus is disclosed for estimating the far-field acoustic tonal signature of noise emanating from a vessel by receiving acoustic signals at a location that is in the near-field of the noise radiated by the vessel. "Near-field" is defined in its customary sense as meaning any distance closer than the far-field distance defined earlier. A unique aspect of this estimation process is the use of in-water phase-reference-data to determine consistent phase differences, rather than the use of arbitrary phase-reference-data, such as that produced by a tone generator. Using the in-water phase-reference-data compensates automatically for slow variations (approximately <1 Hz) in the tonal characteristics of noise data typical of machinery. If an external, arbitrary phase reference were to be used, it would be extremely difficult to compensate for this variation.

The apparatus of the invention includes a reference hydrophone for receiving an acoustic signal emanating from the vessel wherein the reference hydrophone generates an electrical signal representative of the phase, frequency, and amplitude of the acoustic signal received at the reference hydrophone.

In addition, at least one movable hydrophone is positioned to be moved in the water adjacent the vessel to receive an acoustic signal emanating from the vessel that is variable depending upon the location of the movable hydrophone. The movable hydrophone generates a variable signal that is representative of the phase, frequency, and amplitude of the acoustic tonal as received at the movable hydrophone's location. A data processing system is used to estimate the vessel's far-field acoustic signal based upon the reference and movable hydrophone signals.

Preferably, the movable hydrophone can be placed at predetermined positions adjacent the vessel, and the data processing system will estimate the amplitude of the acoustic signal as it would be received at a plurality of (far-field) locations remote from the vessel.

In one preferred embodiment of the invention, the apparatus includes a plurality of movable hydrophones arranged in an array disposed alongside the vessel's hull. In this embodiment, the data processing system includes a respective amplifier for receiving the signal from each of the hydrophones and for generating an amplified signal in response thereto. A digital-analog tape (DAT) recorder is electrically connected to each of the amplifiers for receiving the amplified signals.

Preferably, the data processing system further includes a multi-channel spectrum analyzer operably connected to the DAT recorder for generating an electrical signal representative of the amplitude and phase of the acoustic signal received by the hydrophones. Moreover, the data processing system further includes a computer operably connected to the spectrum analyzer for estimating the amplitude of the acoustic signal at locations remote from the vessel, far-field locations, based upon the electrical signals received.

In another aspect of this invention, a method for estimating a ship's far-field acoustic signature includes disposing at least one hydrophone adjacent the ship along a predetermined line. This method includes generating near-field data sequentially at a plurality of locations in the near-field, and then generating far-field data representative of the ship's far-field acoustic signature based on the collected near-field data.

In another aspect of this invention, a system for estimating a vessel's far-field acoustic signature includes at least one hydrophone which is positioned to sense at least a portion of the vessel's acoustic signature as it exists adjacent the vessel at a plurality of sites located substantially on the surface of a prolate sphere. The hydrophone generates a signal in response to the sensing of the acoustic signature. As intended by the invention, the major and minor axes of the prolate sphere are substantially equal to one-half the length and beam of the vessel, respectively. A data processing system is operably connected to the hydrophones for estimating the vessel's far-field acoustic signature based upon the signal received by the hydrophones.

OBJECTS OF THE INVENTION

It is an object of this invention to provide a system for estimating the far-field acoustic tonal signature of a vessel from a location that is local or near-field to the vessel.

Another object of this invention is to provide a system for estimating the far-field acoustic tonal signature of a vessel from a location that is local to the vessel in which the system is carried and used on the vessel whose acoustic tonal signature is being estimated.

Yet another object of this invention is to provide an easy-to-use and cost-effective system for estimating the far-field acoustic tonal signature of a vessel from a location that is local to the vessel in which the system is carried and used on the vessel whose acoustic tonal signature is being estimated.

Other objects, advantages and new features of the invention will become apparent from the following detailed description of the invention when considered in conjunction with the accompanying drawings.

DESCRIPTION OF THE PREFERRED EMBODIMENT

Figure 1:
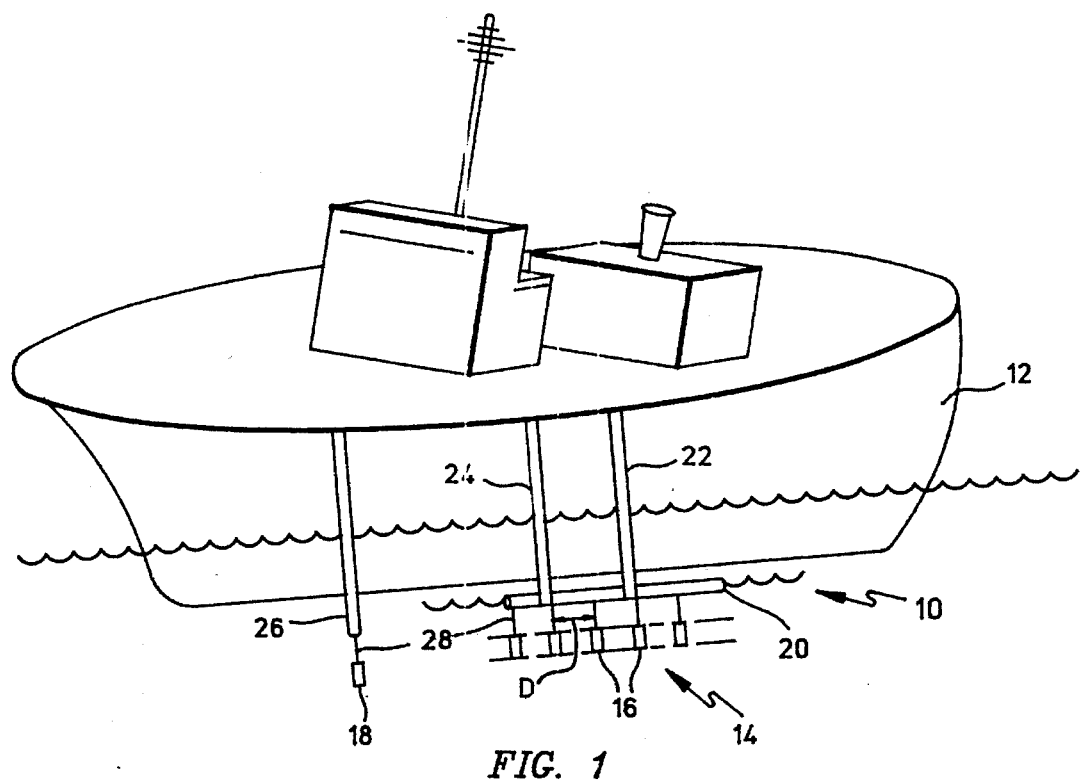
FIG. 1 is a schematic diagram of a vessel showing one arrangement of a hydrophone array according to the invention.

Referring to FIG. 1, a system, generally designated 10, is shown attached to a ship 12 for estimating the far-field acoustic tonal signature of the ship. As shown, system 10 includes an array 14 of movable hydrophones 16. System 10 also includes a reference hydrophone 18. As shown, both movable hydrophone 16 and reference hydrophone 18 are suspended from ship 12 and are disposed in the water in which ship 12 floats just a few feet away from the ship's hull.

As further shown in FIG. 1, movable hydrophones 16 are each suspended from a free flooding boom 20 such as a one-inch diameter polyvinyl chloride (PVC) pipe. FIG. 1 shows that boom 20 is deployed in the water a few feet away from ship 12. Boom 20 can be deployed at an adjustable depth under the water's surface.

The distance between adjacent hydrophones 16 is preferably two feet and in the preferred embodiment approximately fifteen hydrophones 16 are suspended from boom 20. To maintain boom 20 in a relatively stationary position in the water, two struts 22 and 24, preferably made of two-inch diameter PVC pipe, are attached to boom 20 and to ship 12. In a preferred embodiment, the length of each strut 22 and 24 is ten feet. The struts 22 and 24 can be glued to boom 12 via t-fittings (not shown) and can be further fastened to boom 12 by means well known in the art (e.g., bolting, etc.).

Like the movable hydrophones 16, reference hydrophone 18 is suspended from a strut 26 such as a PVC pipe. Hydrophones 16 and 18 are electrically connected to components on board ship 12 via electrical lines 28 which extend through the respective struts 22, 24 and 26. In one preferred embodiment of the invention, each movable hydrophone 16 includes a urethane potted ceramic disk with an integral preamplifier. If desired, each electrical line 28 can be further supported by surrounding the wire 28 with surgical rubber tubing to provide compliance to isolate the hydrophone from mechanical vibrations. It is to be understood that the electrical lines 28 associated with movable hydrophones 16 can be joined in a single cable (not shown) which extends through one of struts 22, 24.

Preferably, reference hydrophone 18 is deployed near midships relative to ship 12. Reference hydrophone 18, in a preferred embodiment, is an Inter-Ocean Systems model 902 underwater acoustic listening and calibration system. Such a system includes a calibrated hydrophone, a cable and an adjustable gain amplifier with attenuator calibrated directly.

Figure 2:
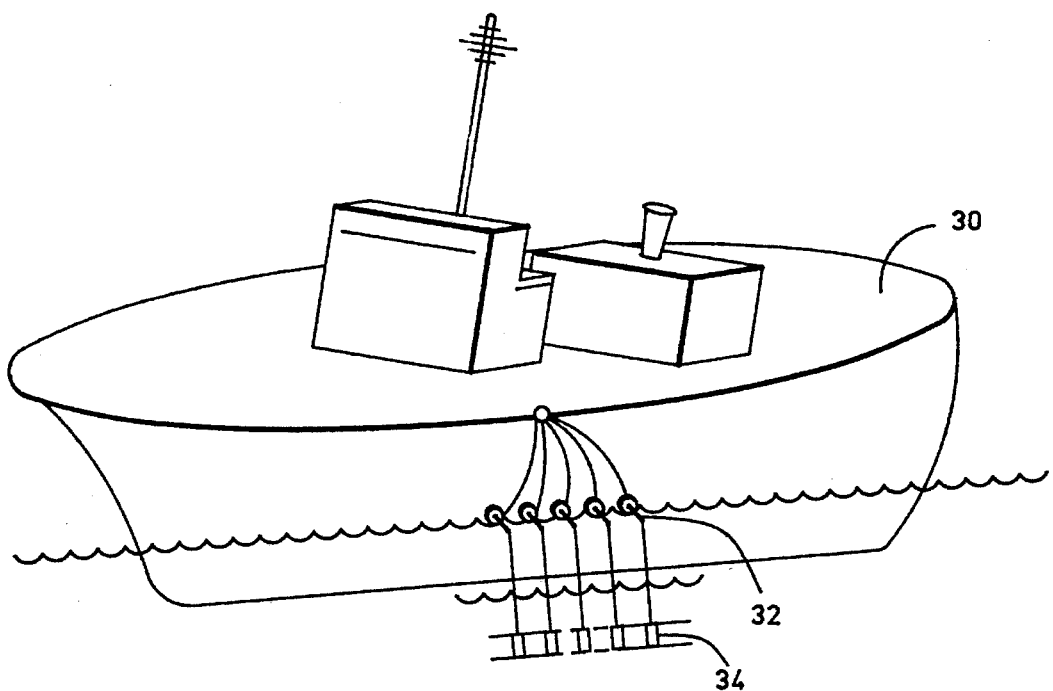
FIG. 2 is a schematic diagram of a vessel showing an alternate arrangement of a hydrophone array according to the invention.
Figure 3:
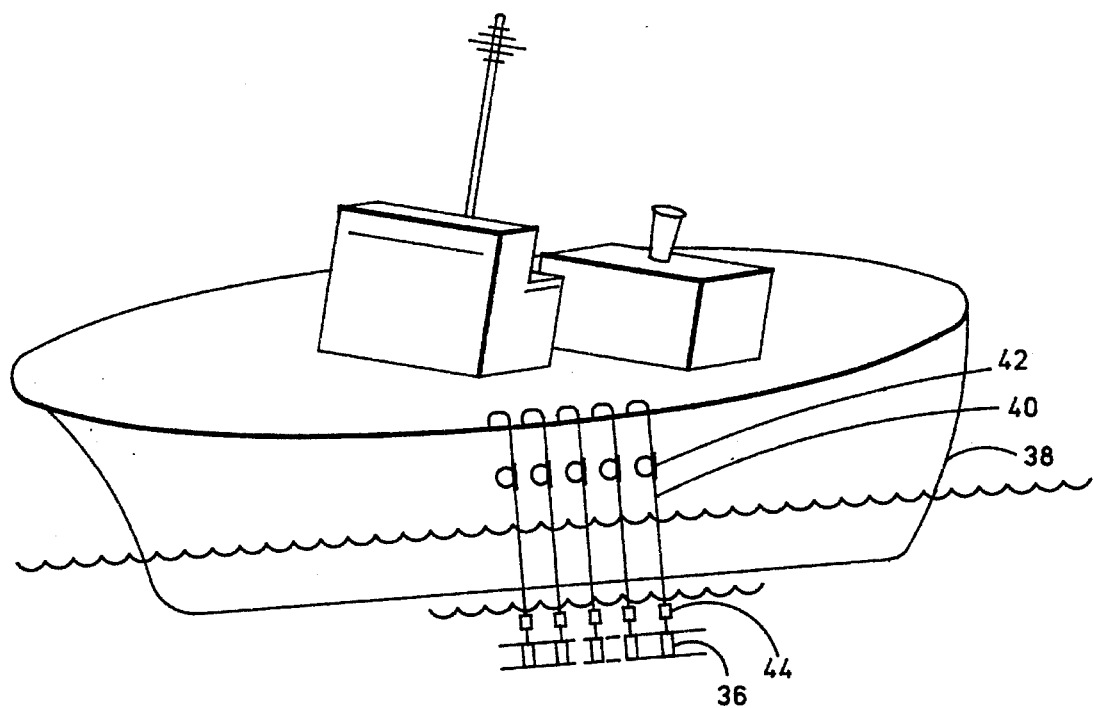
FIG. 3 is a schematic diagram of a vessel showing yet another alternate arrangement of a hydrophone array according to the invention.

Referring briefly to FIGS. 2 and 3, alternative methods are shown by which movable hydrophones of the invention may be disposed alongside a ship. For example, FIG. 2 shows a ship 30 having a plurality of magnetic brackets 32 attached to the hull. Hydrophones 34 are, in turn, suspended from the respective brackets. FIG. 3, on the other hand, shows that a plurality of hydrophones 36 can be attached to a ship 38 via respective bungee cords 40. Each bungee cord 40 can have an associated take-up reel 42. Further, each line 40 has an associated weight 44 to insure that the associated hydrophone 38 remains properly disposed under the surface of the water.

Figure 4:
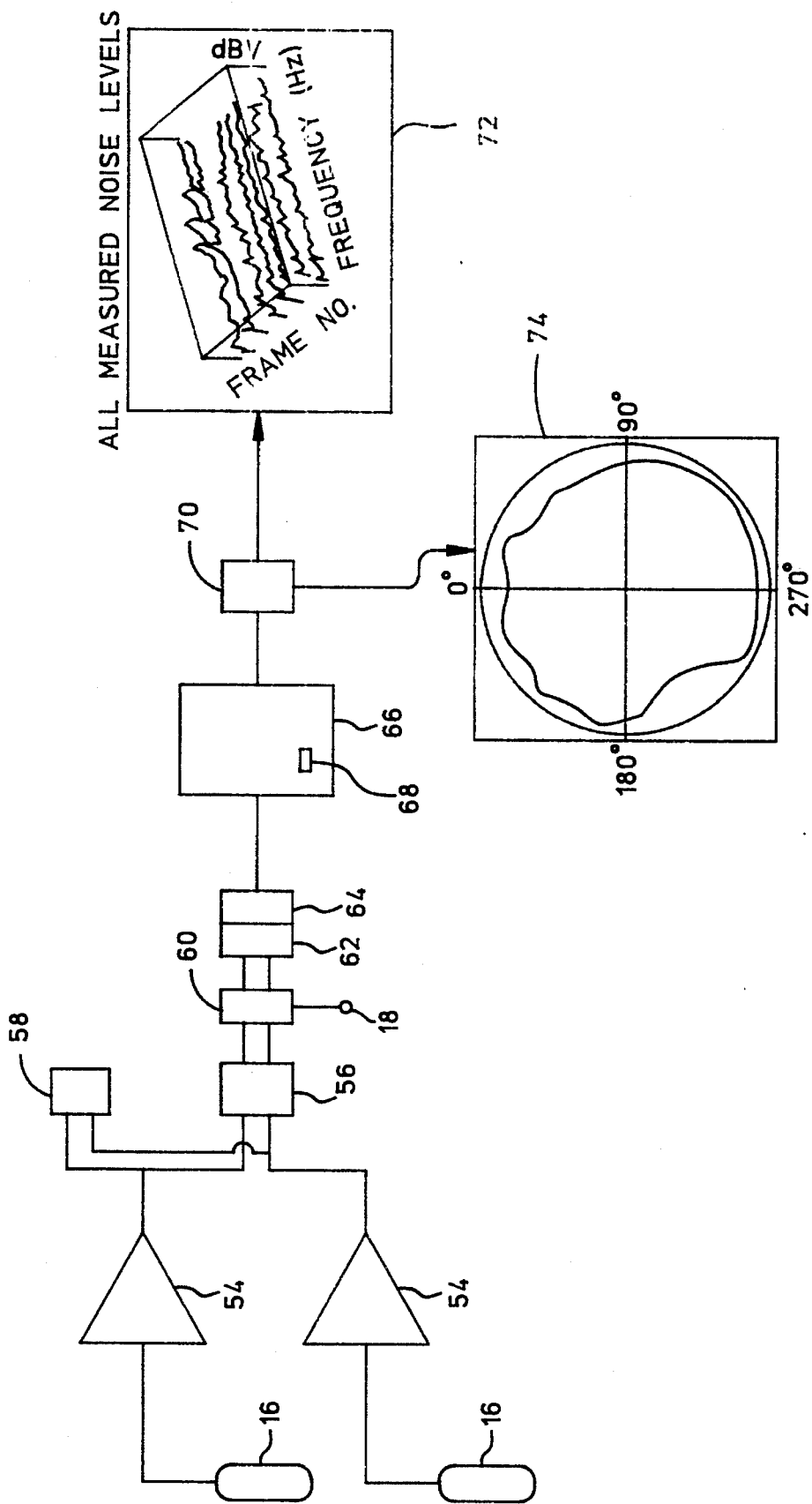
FIG. 4 is a schematic diagram showing a data processing system according to the invention.

Referring now to FIG. 4, the electrical components of the invention are shown. Each movable hydrophone 16 is connected to a respective preamplifier 54. In turn, the preamplifiers 54 are connected to an array junction box 56. Array junction box 56 preferably includes a single pole, high pass ten Hertz (10 Hz) filter. If desired, a monitoring oscilloscope 58 can be connected to each preamplifier 54 to monitor the signals from hydrophones 16.

From array junction box 56, filtered preamplified signals are sent to a data recorder 60 which records this data. In a preferred embodiment of the invention, this data recorder is a TEAC model RD-200T. Furthermore, the signal from reference hydrophone 18, shown in FIG. 4, is sent to data recorder 60. Data recorder 60 is then connected to an 8-channel multiplexer (MUX) 62 which in turn feeds a 16-bit analog-to-digital (A/D) converter 64.

The signal from the A/D converter 64 is then input into a personal computer 66. In accordance with the invention, personal computer 66 includes a digital signal processor card 68 to provide preferably forty five averages of amplitude and phase for each channel, i.e. for the signal from each hydrophone 16. Preferably, card 68 includes an AT&T model digital signal processor number 32C. As discussed more fully below, the phase of the signal from each hydrophone 16, i.e. from each channel, is measured relative to the phase of the signal from reference hydrophone 18.

The output of computer 66 is sent to a plotter 70 to generate a three-dimensional display 72 for the measured noise levels versus frame number of ship 12 versus frequency. Additionally, plotter 70 can present a two-dimensional display 74 of the far-field sound levels of ship 12 versus relative bearing from ship 12.

Figure 5:
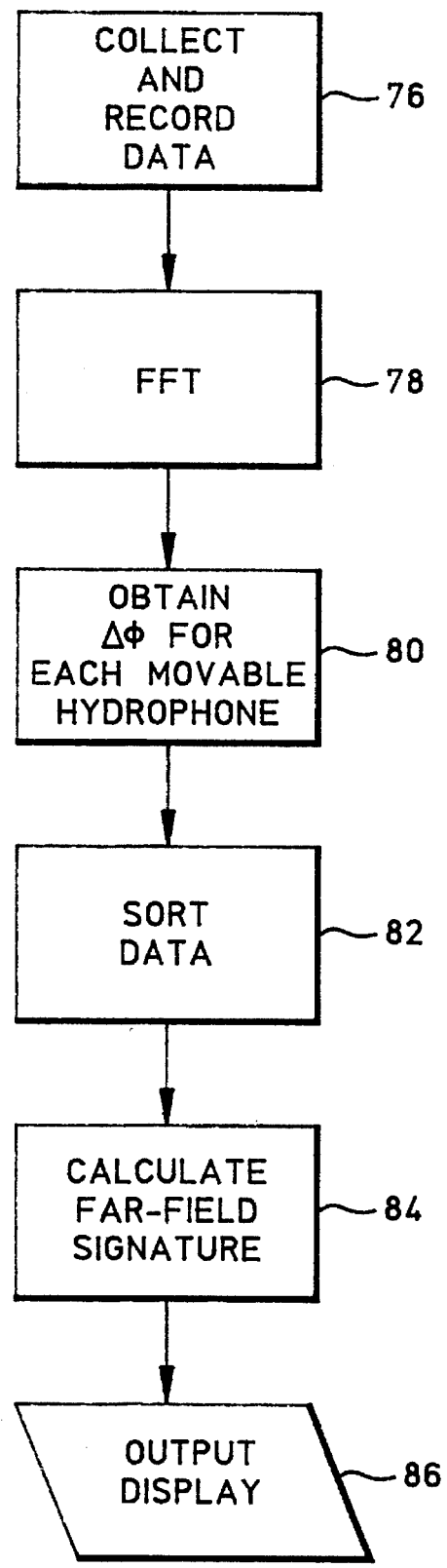
FIG. 5 is a block diagram showing the steps of a method for estimating a ship's far-field acoustic signature according to the invention.

Now referring to FIG. 5, the operation of the invention can be seen. First, as indicated at block 76, data in the near-field is obtained and recorded. In collecting the data, array 14 of movable hydrophones 16 is placed adjacent reference hydrophone 18.

Figure 6:
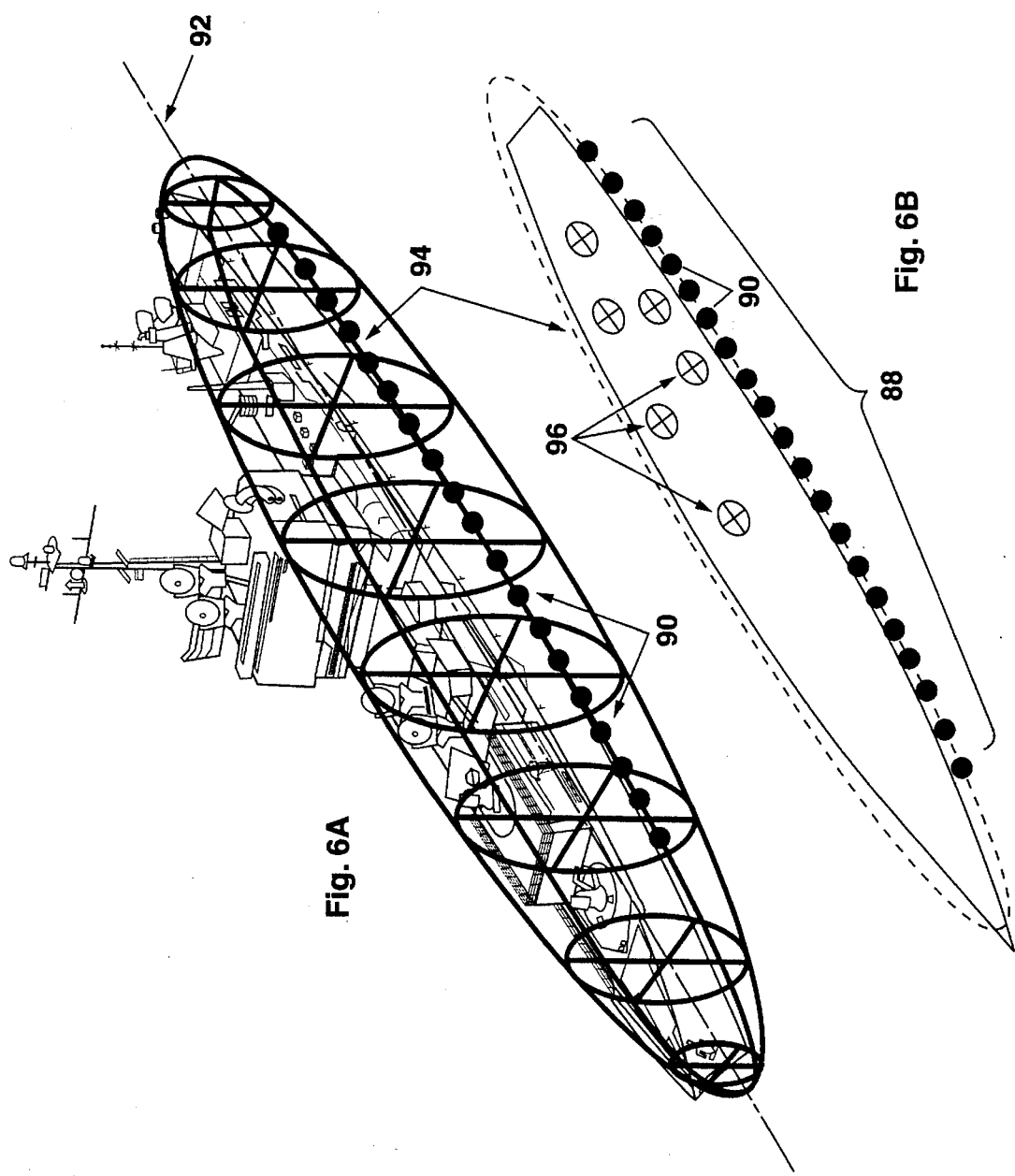
FIG. 6A is an isometric view of a representative vessel surrounded by a prolate spheroid and illustrating an exemplary measurement path as may be used in accordance with the invention.
FIG. 6B is a simplified plan view of the figure illustrated in FIG. 6A.
Figure 7:
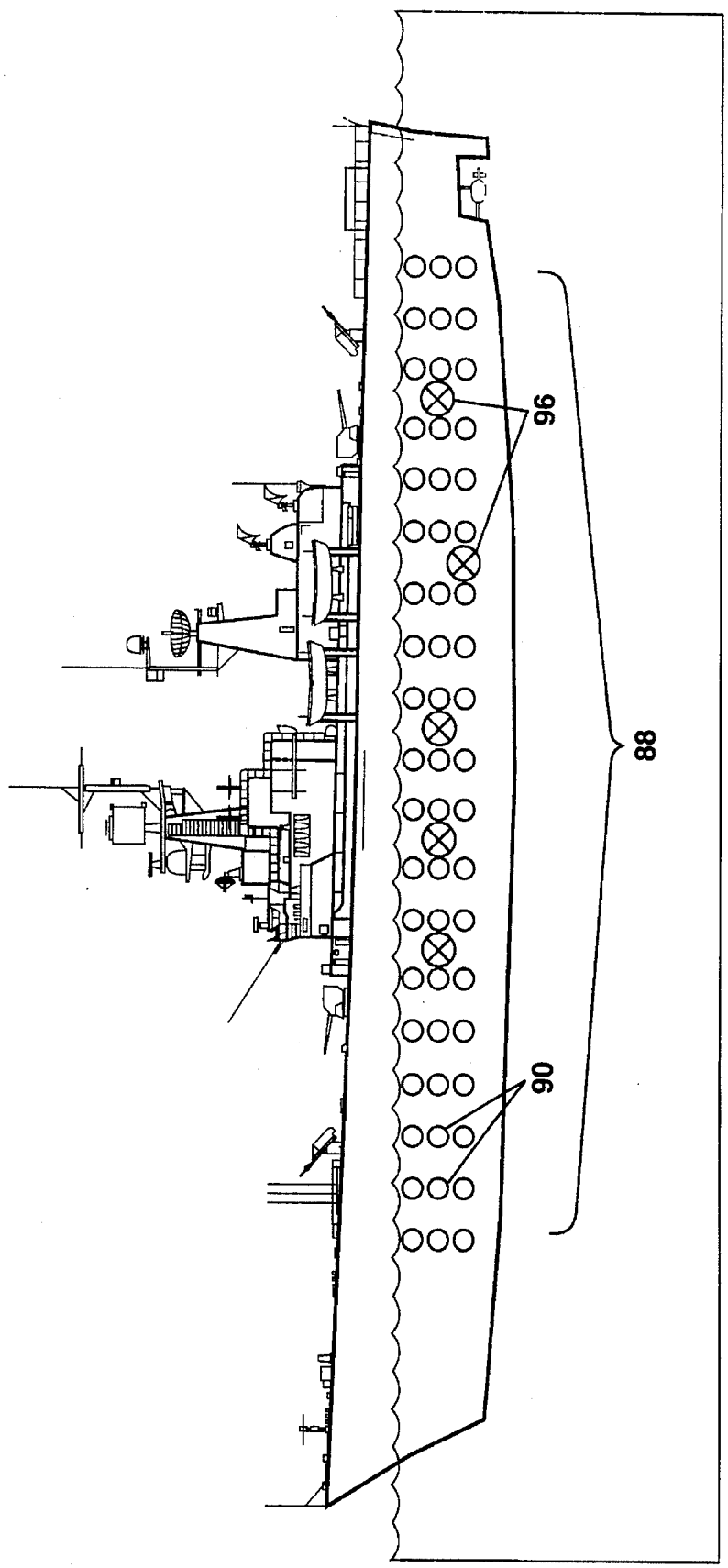
FIG. 7 is a side view of a representative vessel showing an exemplary arrangement of hydrophones as may be used in the invention.

Specifically, array 14 is positioned such that a first one of the two end-most movable hydrophones 16 is two feet forward or aft of reference hydrophone 18. FIGS. 6 and 7 show measurement path 88 of hydrophone locations 90, though not drawn to scale. The acoustic tonals emanating from the ship 12 are detected by hydrophones 16 and 18 and are sent to the components discussed above and shown in FIG. 4. Next, array 14 is moved forward or aft along the hull of ship 12 such that the first end-most movable hydrophone 16 is preferably at two feet past the previous location of the second end-most hydrophone, and data is again collected. This process is repeated until data has been collected along the length of ship 12.

It is to be understood that while the preferred embodiment of the invention includes the use of an array 14 having fifteen movable hydrophones 16, and one reference hydrophone 18, greater or fewer hydrophones 16 and 18 can be used in accordance with the principles of the invention.

Next, at block 78, a fast Fourier transform (FFT) is applied to the signals from hydrophones 16 and 18 to determine the phase and amplitude components of each signal. Then, at block 80, the phase component $\phi$ of the signal from each movable hydrophone 16 is subtracted from the phase component $\phi$ of the signal from reference hydrophone 18 to render a signal representative of the phase difference ($\Delta\phi$).

Continuing with the description of the operation of the invention, block 82 indicates that the transformed data is sorted by dominant tonal for each movable hydrophone 16 location at which data was obtained. Then, at block 84, the far-field bearing- and frequency-dependent acoustic characteristics of the ship 12 are determined based upon the near-field collected data. "Near-field" is defined in its customary sense as meaning any distance closer than the far-field distance defined earlier. In a preferred embodiment, this distance is two feet from the hull of a vessel being analyzed.

Referring to FIGS. 6A and 6B in general, the far-field acoustic signal P (pressure) at a radial distance r from center 92 of a prolate spheroid surface 94 surrounding signal source 96 can be determined using the near-field acoustic field $P_0(\eta_0)$ detected substantially on the surface of the spheroid:

$$P = \frac{e^{ikr}}{kr} \Psi(\eta) \tag{1}$$

where k=wave number of the tonal=$1/\lambda$, where $\lambda$=wavelength of tonal.

As the skilled artisan will recognize, the above equation may be rewritten as:

$$P=[\cos (kr)+i \sin (kr)]\Psi(\eta)/kr, \tag{2}$$

where $$\Psi(\eta) \approx (C^2/2)(\xi_s^2-1)^{-.5}\{\oint^1_{-1} iD[A \cos (E)-B \sin (E)] P_0(\eta_0)\delta\eta_0 +$$
$$\oint^1_{-1} D[-A \sin (E)-B \cos (E)]P_0(\eta_0)\delta\eta_0\},$$

where

C=kd/2, d=2f=distance between the foci of the prolate spheroid, $E=-C\eta\eta_0\xi_s$, $\eta=z/(f\xi)$, z=distance along polar axis of the prolate spheroid, $\eta_0=z/(f\xi_s)$, $\xi_s=\{1-b^2/a^2\}^{.5}$, a=semi-minor axis of the prolate spheroid (roughly one-half the maximum beam of ship 12), b=semi-major axis of the prolate spheroid (roughly one-half the length of ship 12), f=focal distance of elliptical prolate spheroid=$(a^2-b^2)^{.5}$, $\xi=0.25\{1+(r/f)^2+[(1+(r/f)^2)^2-4(z/f)^2]^{.5}$, and $F=-C[(1-\eta^2)(1-\eta_0^2)(\xi_s^2-1)]^{.5}$, $G=\eta\eta_0[(\xi_s^2-1)/(\xi_s^2-\eta_0^2)]^{.5}$ $H=\xi_s[(1-\eta^2)(1-\eta_0^2)/\xi_s^2-\eta_0^2)]^{.5}$ $A=(1+G)J_0(F)$ $B=HJ_1(F)$, $J_0$ and $J_1$ being Bessell functions of the first kind, and $D=(\xi_s^2-\eta_0^2)^{.5}$ The above-disclosed integrations are preferably performed using Simpson method integration of the real and imaginary parts under the integral. The imaginary integration product is then combined with the real integration product to generate an output signal representative of the far-field frequency- and bearing-dependent acoustic tonal characteristics of ship 12. At block 86 in FIG. 6, this data can then be displayed, e.g., on displays 72 or 74 of FIG. 4.

While the above-described system for estimating far-field acoustic tonals is fully capable of achieving the above-stated objects of the invention, it is to be understood that the preferred embodiment of the invention has been described, and that other embodiments may exist as may become obvious to those skilled in the art, that the above-described embodiment accordingly is but one representative embodiment of the invention, and that the scope of this invention is consequently to be limited by nothing other than the appended claims.

What is claimed is:

1. An apparatus for estimating the far-field acoustics of a vessel comprising:

a reference hydrophone for receiving an acoustic signal emanating from the vessel wherein said reference hydrophone generates an electrical signal representative of the phase, frequency, and amplitude of the acoustic signal as received at the reference hydrophone;

at least one movable hydrophone positionable in water adjacent the vessel for receiving the acoustic signal from the vessel, wherein the movable hydrophone generates a variable signal representative of the phase, frequency, and amplitude of the acoustic signal as received at the movable hydrophone; and data processing means operably connected to both hydrophones for estimating the far-field acoustics of the vessel at the location based upon the reference signal and variable signal.

2. The apparatus of claim 1, wherein the movable hydrophone can be positioned at predetermined locations adjacent the vessel, and the data processing system estimates far-field acoustics present at a plurality of locations remote from the vessel.

3. The apparatus of claim 2, further comprising a plurality of movable hydrophones arranged in an array, wherein the array is physically connected to the vessel.

4. The apparatus of claim 3, wherein the data processing means includes a respective amplifier for receiving the signal output from each of the hydrophones and for generating an amplified signal in response thereto, and a digital-analog tape (DAT) recorder operably connected to each of the amplifiers to receive the amplified signals from the amplifiers and to record the amplified signals.

5. The apparatus of claim 3, wherein the data processing means further includes a multi-channel spectrum analyzer operably connected to the DAT recorder for generating an electrical signal representative of the amplitude and phase of the acoustic signal received by the hydrophones.

6. The apparatus of claim 5, wherein the data processing system further includes a computer operably connected to the spectrum analyzer, the computer for estimating the far-field acoustics of the vessel based upon the electrical signal.

7. A system for estimating a vessel's far-field acoustic signal, comprising:

at least one hydrophone positioned to sense at least a portion of the vessel's acoustic signal as it exists adjacent the vessel at a plurality of sites located substantially on the surface of a prolate sphere, wherein the major and minor axes of the prolate sphere are substantially equal to one-half the length and beam of the vessel, respectively, the hydrophone generates a signal in response to the acoustic signature sensed; and data processing means operably connected to the hydrophone for estimating the vessel's far-field acoustic signal based upon the signal from the hydrophone.

8. The system of claim 7, comprising a movable hydrophone and a reference hydrophone, wherein the movable hydrophone is positionable at predetermined locations adjacent the vessel.

9. The system of claim 8, further comprising a plurality of movable hydrophones arranged in an array, wherein the array is physically connected to the vessel.

10. The system of claim 9, wherein the data processing means includes a respective amplifier for receiving the signal from each of the hydrophones and for generating an amplified signal in response thereto, and a digital-analog tape (DAT) recorder operably connected to each of the amplifiers for receiving the amplified signals from the amplifiers and for storing the amplified signals.

11. The system of claim 10, wherein the data processing means further includes a multi-channel spectrum analyzer operably connected to the DAT recorder for generating an electrical signal representative of the amplitude and phase of the vessel's acoustic signal as received by the hydrophones.

12. The system of claim 11, wherein the data processing means further includes a computer operably connected to the spectrum analyzer for estimating the amplitude of the vessel's far-field acoustic signal based upon the electrical signal.

* * * * *